(12) United States Patent
Nam

(10) Patent No.: US 7,539,521 B2
(45) Date of Patent: *May 26, 2009

(54) LOCKING MECHANISM

(75) Inventor: Sang-Eun Nam, Gyeonggi-Do (KR)

(73) Assignee: LG Electronics, Inc., Seoul (KR)

( * ) Notice: Subject to any disclaimer, the term of this patent is extended or adjusted under 35 U.S.C. 154(b) by 34 days.

This patent is subject to a terminal disclaimer.

(21) Appl. No.: 10/808,899

(22) Filed: Mar. 24, 2004

(65) Prior Publication Data
US 2004/0192418 A1 Sep. 30, 2004

(30) Foreign Application Priority Data
Mar. 25, 2003 (KR) ............... 10-2003-0018527

(51) Int. Cl.
H04M 1/00 (2006.01)
H01M 2/10 (2006.01)
E05C 1/08 (2006.01)

(52) U.S. Cl. .............. 455/575.1; 429/97; 429/123; 292/163; 292/175; 455/575.8

(58) Field of Classification Search ......... 292/121, 292/163, 150, 145, 175, 302, 303, 177–181, 292/10, 11; 379/428.04, 433.11–12, 440, 379/437, 445; 455/575.1, 575.4, 575.8; 24/343, 24/371, 171, 195, 631, 163; 429/97–100
See application file for complete search history.

(56) References Cited

U.S. PATENT DOCUMENTS 2,153,077 A * 4/1939 Clarke .................. 24/645
2,797,116 A * 6/1957 Jaster .................... 292/29
3,605,210 A * 9/1971 Lohr .................... 24/635
4,239,269 A * 12/1980 Chiang ................. 292/175
4,334,341 A * 6/1982 Krautz et al. ............ 24/635
5,028,083 A   7/1991 Mischenko ............ 292/175
5,716,730 A * 2/1998 Deguchi ................ 429/97
5,738,954 A * 4/1998 Latella et al. ........... 429/97
5,895,729 A   4/1999 Phelps et al. ........... 429/97
6,014,793 A * 1/2000 Howald ............... 24/265 B
6,625,425 B1 * 9/2003 Hughes et al. .......... 455/90.3
6,785,567 B2 * 8/2004 Kato .................. 455/575.9
7,146,692 B2 * 12/2006 Benedict ................ 24/635
7,441,813 B2 * 10/2008 Qin et al. .............. 292/163

FOREIGN PATENT DOCUMENTS

DE     29605693      8/1996
JP     H04-48669 U   4/1992
JP     05-297980     11/1993
JP     2001-285431   10/2001

* cited by examiner

Primary Examiner—Lester Kincaid
Assistant Examiner—Matthew Sams
(74) Attorney, Agent, or Firm—Lee, Hong, Degerman, Kang & Waimey

(57) ABSTRACT

A locking mechanism includes at least one spring loaded locking member, a lock release device operatively coupled to the spring loaded locking member, and at least one latching member. The latching member is securely gripped by the spring loaded locking member when the lock release device is in partial frictional contact with the spring loaded locking member under the spring bias of the spring loaded locking member. The latching member is released from the grip of the spring loaded locking member when the lock release device is forced in frictional sliding contact with the spring loaded locking member against the spring bias of the spring loaded locking member.

11 Claims, 5 Drawing Sheets

LOCKING MECHANISM

CROSS-REFERENCE TO RELATED APPLICATIONS

Pursuant to 35 U.S.C. § 119(a), this application claims the benefit of earlier filing date and right of priority to Korean Patent Application No. 10-2003-0018527, filed on Mar. 25, 2003, the contents of which is hereby incorporated by reference in its entirety.

BACKGROUND OF THE INVENTION

1. Field of the Invention

The present invention relates generally to locking devices and more particularly to a locking mechanism for a mobile telephone battery cover.

2. Description of the Related Art

FIG. 1 illustrates a conventional locking mechanism 13 for a battery cover 12 being provided within a main body 10 of a mobile telephone set. Battery cover 12 is adapted for implementation with a mobile telephone battery 11, as shown in FIG. 1. Locking mechanism 13 is provided with a decorative protective cover 14, which is coupled to main body 10.

FIGS. 2-3 illustrate the various parts of conventional locking mechanism 13. Specifically, locking mechanism 13 includes a locking member 15, which is movably coupled to a shaft support portion 20 formed in main body 10 via a shaft 16 and a spring 18. Spring 18 is mounted between locking member 15 and main body 10 and adapted to elastically support locking member 15. Locking member 15 includes a lock portion 17 adapted to engage a latching portion 12a of battery cover 12 for locking battery cover 12 to main body 10.

Battery cover 12 may be unlocked from main body 10 by the user pressing on locking member 15 so as to disengage lock portion 17 from latching portion 12a. This type of locking arrangement is not secure as an external impact such as from dropping the mobile telephone on the ground or the like may result in spring 18 being accidentally compressed enough to allow the release of lock portion 17 from latching portion 12a of battery cover 12.

SUMMARY OF THE INVENTION

In accordance with one aspect of the present invention, a locking mechanism comprises at least one spring loaded locking member, at least one lock release device operatively coupled to the spring loaded locking member, and at least one latching member.

In accordance with another aspect of the present invention, the latching member is securely gripped by the spring loaded locking member when the lock release device is in partial frictional contact with the spring loaded locking member under the spring bias of the spring loaded locking member.

In accordance with yet another aspect of the present invention, the latching member is released from the grip of the spring loaded locking member when the lock release device is forced in frictional sliding contact with the spring loaded locking member against the spring bias of the spring loaded locking member.

These and other aspects of the present invention will become apparent from a review of the accompanying drawings and the following detailed description of the present invention.

BRIEF DESCRIPTION OF THE DRAWINGS

The present invention is generally shown by way of reference to the accompanying drawings as follows.

DETAILED DESCRIPTION OF THE PREFERRED EMBODIMENTS

Some embodiments of the present invention will be described in detail with reference to the related drawings of FIGS. 1-8. Additional embodiments, features and/or advantages of the invention will become apparent from the ensuing description or may be learned by practicing the invention.

In the figures, the drawings are not to scale with like numerals referring to like features throughout both the drawings and the description.

The following description includes the best mode presently contemplated for carrying out the invention. This description is not to be taken in a limiting sense, but is made merely for the purpose of describing the general principles of the invention.

Figure 1:
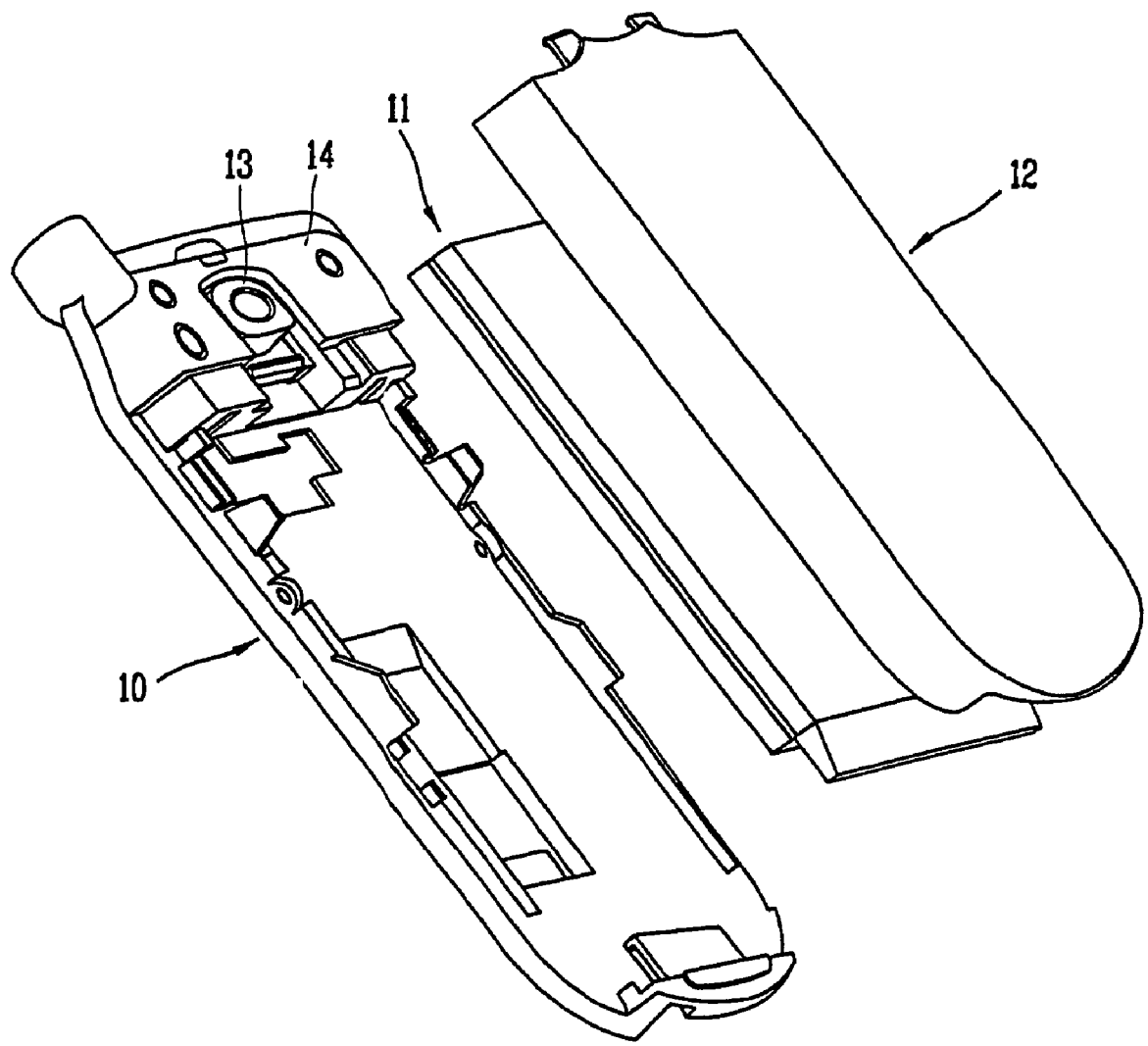
FIG. 1 illustrates a conventional locking mechanism for a battery cover of a mobile telephone set.
Figure 2:
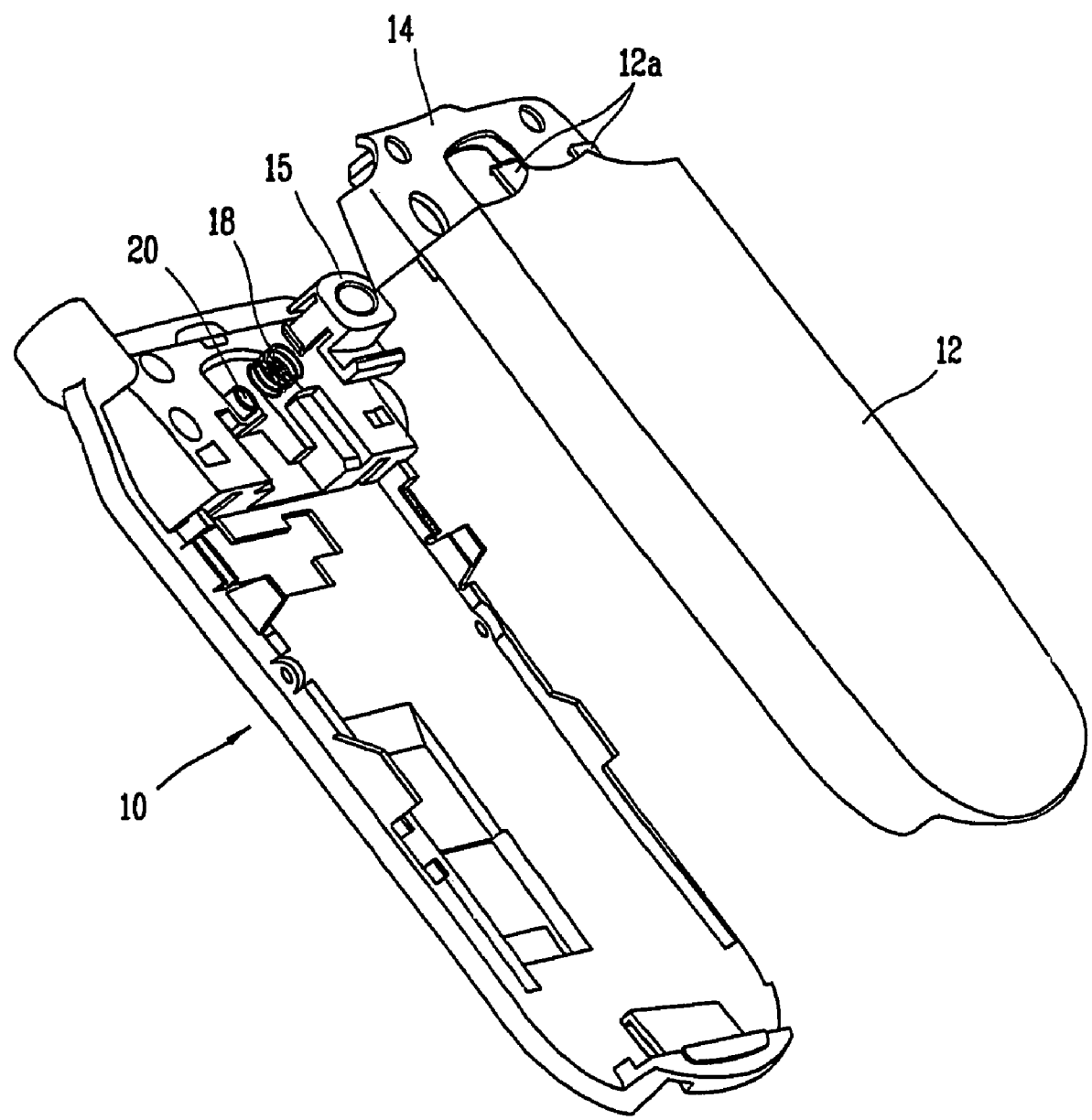
FIG. 2 illustrates the general composition of the conventional locking mechanism of FIG. 1.
Figure 3:
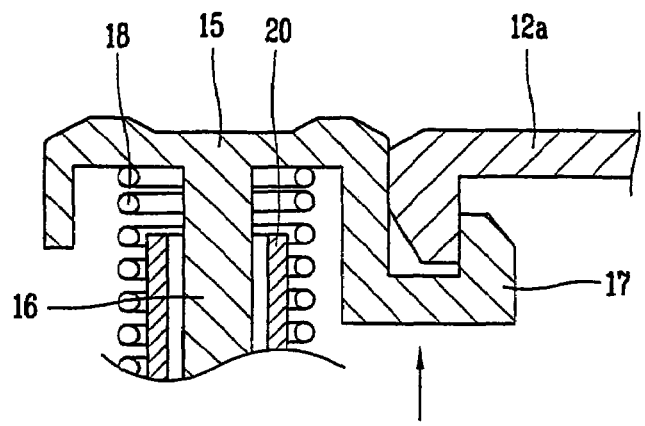
FIG. 3 further illustrates the composition of the conventional locking mechanism of FIG. 1.
Figure 4:
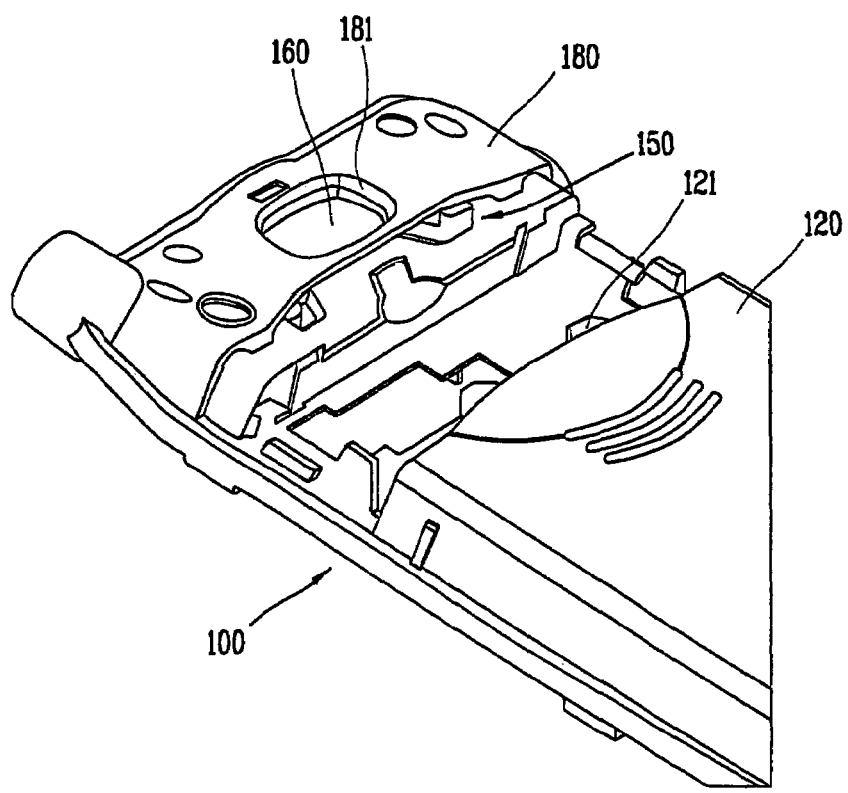
FIG. 4 schematically illustrates a locking mechanism in accordance with one embodiment of the present invention.
Figure 5:
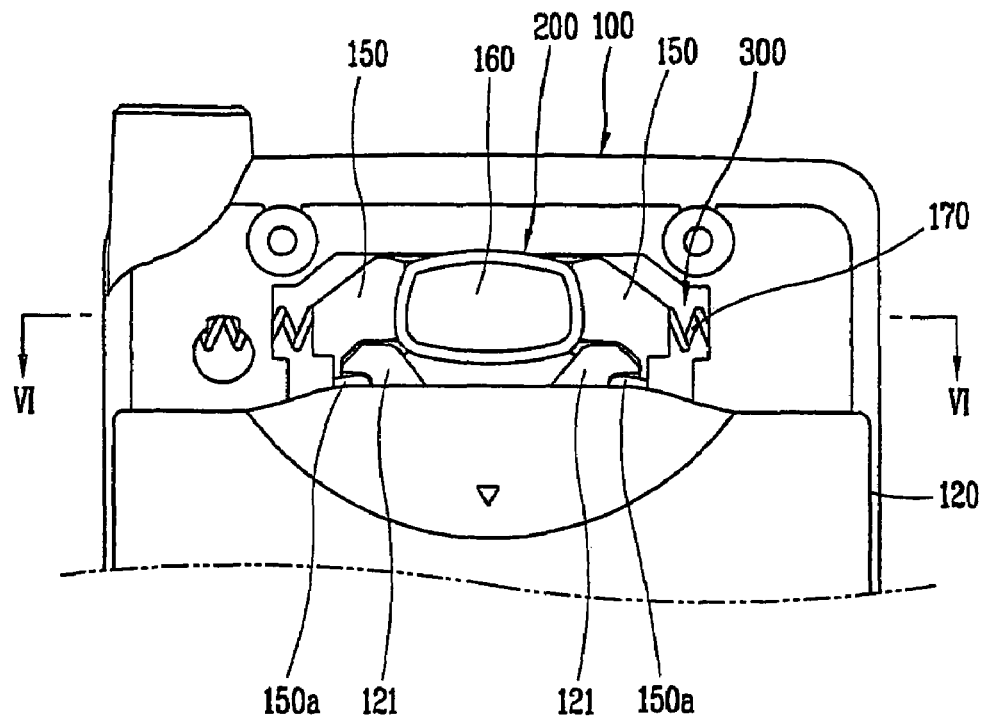
FIG. 5 schematically depicts a battery cover being securely locked to the main body of a mobile telephone set utilizing the locking mechanism of FIG. 4.

FIG. 4 schematically illustrates a locking mechanism in accordance with a preferred embodiment of the present invention. The locking mechanism may be used to securely lock a battery cover to the main body of a mobile telephone set, as generally shown in reference to FIG. 4. The battery cover locking mechanism of FIG. 4 preferably comprises a pair of oppositely disposed generally hook-shaped latching members 121 formed on a battery cover 120, and a pair of spring-loaded locking members 150 slidably disposed opposite each other within a main body 100 of the mobile telephone set. Each locking member 150 includes a locking leg 150a adapted to grip a corresponding latching member 121 to secure battery cover 120 to main body 100. Locking members 150 are spring-loaded via a corresponding pair of transverse elastic members 300, as generally shown in FIG. 5.

Figure 6:
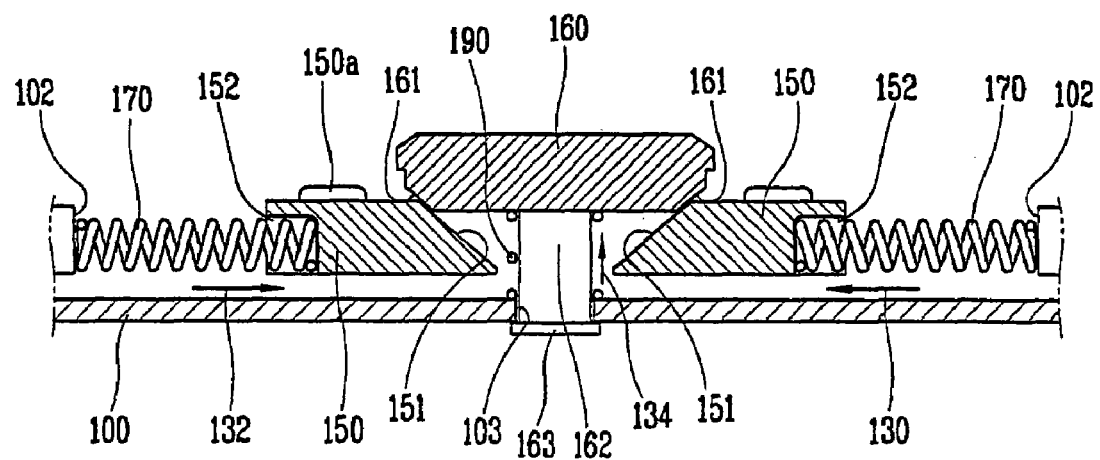
FIG. 6 is a cross-sectional view taken along section line VI-VI of FIG. 5.
Figure 8:
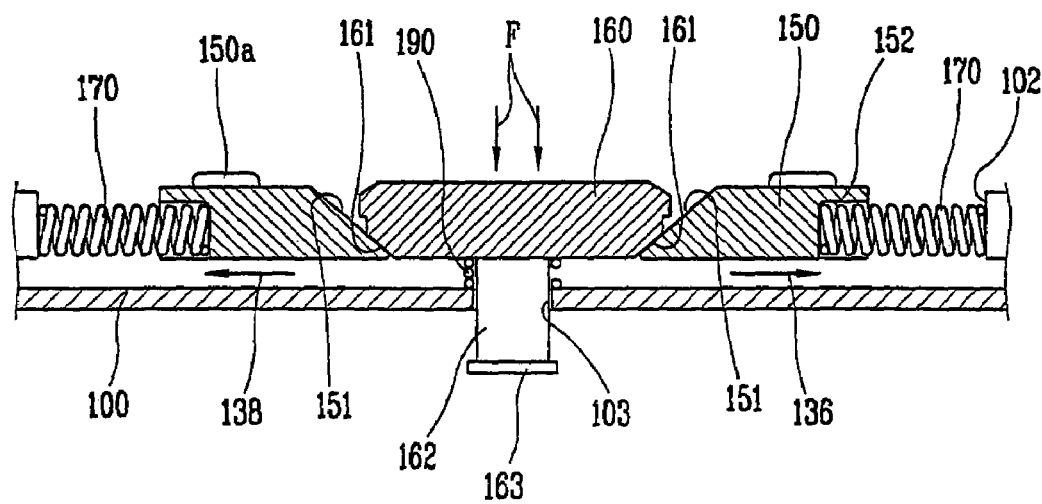
FIG. 8 is a cross-sectional view taken along section line VIII-VIII of FIG. 7.

The battery cover locking mechanism also preferably comprises a lock release device 200 adapted to move linearly in a direction which is substantially perpendicular to a generally linear direction in which each locking member 150 moves, and a longitudinal elastic member 190 coupled to lock release device 200, as generally depicted in FIGS. 6 and 8.

Lock release device 200 includes a push button 160 (FIGS. 5-8) to which an external generally vertical force may be applied for moving locking members 150 in a generally transverse linear direction, as generally illustrated in FIGS. 6 and 8. Push button 160 is integrally coupled to a support member 162, which is adapted to move vertically within a generally round-shaped aperture 103 formed in main telephone body 100. Support member 162 includes a generally ring-shaped bottom stopper that is of greater circumference than the circumference of aperture 103 so as to prevent support member 162 from completely escaping through aperture 103. Push button 160 preferably includes a pair of oppositely disposed lateral inclined surfaces 161 which are in frictional contact with a corresponding pair of inclined lateral surfaces 151 of locking members 150, as generally shown in FIGS. 6 and 8. Push button lateral surfaces 161 are preferably adapted to match the curvature of lateral locking member surfaces 151 to allow frictional sliding contact between the same.

Transverse elastic member 300 may be in the form of a spring 170 operatively coupled between a spring support portion 102 of main telephone body 100 and a spring support portion 152 of locking member 150. Spring support portion 152 is formed at a side that is disposed generally opposite lateral side 151 of locking member 150. Springs 170 are preferably biased to urge locking members 150 together in the absence of an opposing external force, as generally shown by directional arrows 130, 132 of FIG. 6. A person skilled in the art would readily appreciate that locking members 150 may be spring loaded in a variety of ways, such as by utilizing only one spring instead of two springs. Other spring loading configurations may be utilized provided such other configurations do not depart from the intended scope and spirit of the present invention.

Longitudinal elastic member 190 is operatively coupled between push button 160 and main telephone body 100, as generally depicted in FIGS. 6 and 8. Longitudinal elastic member 190 may be in the form of a spring biased to urge push button 160 generally in a direction 134 (FIG. 6) opposite a vertical force F (FIG. 8) which may be applied to push button 160 (by the user) to move locking members 150 apart. Spring-loaded push button 160 automatically returns to its initial unpressed state under the spring bias of elastic member 190 as soon as the user releases push button 160. Push button 160 protrudes from a decorative cover plate 180 via an opening 181. Decorative cover plate 180 generally covers the main telephone body area in which locking members 150 are being disposed.

FIGS. 5-6 schematically depict battery cover 120 being locked to main telephone body 100. Specifically, each latching member (121) of battery cover 120 is securely gripped by a corresponding locking leg 150a of spring-loaded locking member 150 since locking member springs 170 are biased to urge locking members together in the absence of an opposing external force. Push button lateral surfaces 161 are in partial frictional contact with locking member lateral surfaces 151 under the spring bias of locking member springs 170, respectively, as generally shown in FIG. 6. This type of lock helps prevent the unwarranted release of battery cover 120 from main telephone body 100 in case of an accidental impact or force due to the mobile telephone set being dropped to the ground or the like.

Figure 7:
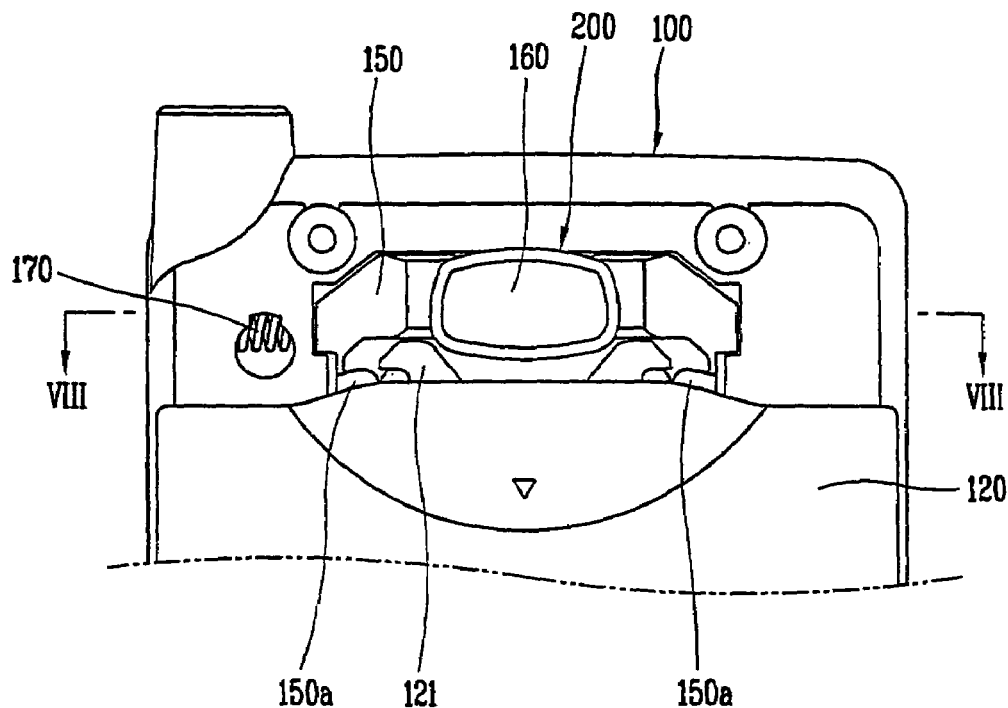
FIG. 7 schematically depicts a battery cover being unlocked from the main body of a mobile telephone set utilizing the locking mechanism of FIG. 4.

FIGS. 7-8 schematically depict battery cover 120 being unlocked from main telephone body 100. Latching members 121 are released from the grip of locking legs 150a as a result of push button 160 being pressed by the user via opening 181 of decorative cover plate 180 (FIG. 4). Pressing push button 160 in the general direction shown by force F of FIG. 8 causes inclined lateral push button surfaces 161 to push locking members 150 linearly away from each other via frictional sliding contact with corresponding inclined locking member lateral surfaces 151, as generally depicted by directional arrows 136, 138 of FIG. 8.

Pressing push button 160 with enough force F to linearly move locking members 150 away from each other so as to cause the release of latching members 121 from the grip of locking legs 150a is generally depicted in FIG. 7. FIG. 8 generally shows support member 162 having moved vertically downwards in the direction of force F via aperture 103 of main telephone body 100 as a result of push button 160 being pressed by the user. Releasing push button 160 by the user after battery cover 120 has been unlocked from main telephone body 100 results in push button 160 automatically returning to its initial unpressed state (under the spring bias of elastic member 190) in which push button 160 generally protrudes from decorative cover plate 180 via opening 181.

A person skilled in the art would recognize that the above-described novel locking mechanism is not restricted to mobile telephone battery cover locking applications, but may be easily implemented in various other locking applications. Other components and/or configurations may be utilized in the above-described embodiments. For example, the latching and locking members, described hereinabove and shown in the accompanying drawings, may be configured in many other ways, provided such other configurations do not depart from the intended scope of the present invention.

Moreover, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

While the present invention has been described in detail with regards to several embodiments, it should be appreciated that various modifications and variations may be made in the present invention without departing from the scope or spirit of the invention. In this regard it is important to note that practicing the invention is not limited to the applications described hereinabove.

Many other applications and/or alterations may be utilized provided that such other applications and/or alterations do not deviate from the intended purpose of the present invention. Also, features illustrated or described as part of one embodiment can be used in another embodiment to provide yet another embodiment such that the features are not limited to the embodiments described above. Thus, it is intended that the present invention cover all such embodiments and variations as long as such embodiments and variations come within the scope of the appended claims and their equivalents.

What is claimed is:

1. A locking mechanism for locking a cover to a main body, comprising:
a plurality of spring loaded locking members, each of the plurality of locking members having a top face and being coupled to the main body, each of the plurality of locking members having a bias spring biasing the locking member in a bias direction in a closed position and having a locking leg extending orthogonally to each said bias direction from the top face of the locking member;
a lock release device operatively coupled to the plurality of locking members to simultaneously move each of the plurality of locking members against its bias spring, wherein each of the plurality of locking members moves laterally in a different direction, wherein the lock release device moves orthogonally to each of the plurality of locking members, and wherein the lock release device is biased in the closed position by a longitudinal elastic member; and a plurality of latching members adjacent to the top face of the locking members, the plurality of latching members being attached to the cover and separate from the lock release device, each of the latching members being securely gripped by the locking leg of a respective locking member of the plurality of locking members, wherein the lock release device is in partial frictional contact with the plurality of locking members, wherein each of the plurality of latching members is released from the grip of the corresponding locking member when the lock release device is forced in frictional sliding contact with the plurality of locking members against the spring bias of each of the locking members.

2. The locking mechanism of claim 1, wherein the plurality of latching members and the plurality of locking members are used to removably lock a battery cover to the main body of a mobile telephone set.

3. The locking mechanism of claim 1, wherein the lock release device includes a first surface adapted to match the curvature of a corresponding second surface on each locking member.

4. The locking mechanism of claim 3, wherein each of the first and second surfaces has an inclined configuration.

5. The locking mechanism of claim 3, wherein the first and second inclined surfaces are in frictional sliding contact when the lock release device is forced to move orthogonally to each of the plurality of locking members.

6. A locking mechanism for securing a battery compartment cover to a mobile terminal body, the mechanism comprising:

a first and a second locking member coupled to the main terminal body, the first locking member having a first locking member top face and the second locking member having a second locking member top face;

a first and a second bias spring biasing the first and the second locking members, respectively, in a closed position, the first bias spring biasing the first locking member in a first bias direction, the second bias spring biasing the second locking member in a second bias direction, the first locking member having a first locking leg extending orthogonally to the first bias direction from the first locking member top face, the second locking member having a second locking leg extending orthogonally to the second bias direction from the second locking member top face;

a lock release device operatively coupled to the first and the second locking members to simultaneously move the first locking member in a first direction opposite the first bias direction against the first bias spring and the second locking member in a second direction opposite the second bias direction against the second bias spring wherein the first direction and the second direction are different, wherein the lock release device moves in a third direction that is orthogonal to each of the first direction and the second direction, and wherein the lock release device is biased in the closed position by a longitudinal elastic member; and a first latching member adjacent to the first locking member top face and a second latching member adjacent to the second locking member top face, the first latching member and the second latching member being attached to the battery compartment cover and separate from the lock release device, the first latching member being securely gripped by the first locking leg of the first locking member, the second latching member being securely gripped by the second locking leg of the second locking member, wherein the lock release device is in partial frictional contact with the first and the second locking members, wherein the first latching member is released from the grip of the first locking member and the second latching member is released from the grip of the second locking member when the lock release device is forced in frictional sliding contact with the first and second locking members against the corresponding bias spring of each of the locking members.

7. The locking mechanism of claim 6, wherein the lock release device includes a first surface adapted to match the curvature of a corresponding second surface on each locking member.

8. The locking mechanism of claim 7, wherein each of the first and second surfaces has an inclined configuration.

9. The locking mechanism of claim 6, wherein the lock release device is adapted to move in the third direction against its spring bias.

10. The locking mechanism of claim 9, wherein the third direction is perpendicular to a rear surface of the mobile terminal body.

11. The locking mechanism of claim 9, wherein the first and second inclined surfaces are in frictional sliding contact when the lock release device is forced to move in the third direction.

* * * * *